May 30, 1944.  H. L. STRUBE  2,350,201
RESILIENT SUSPENSION FOR VIBRATING SCREENS AND THE LIKE
Filed Jan. 7, 1942
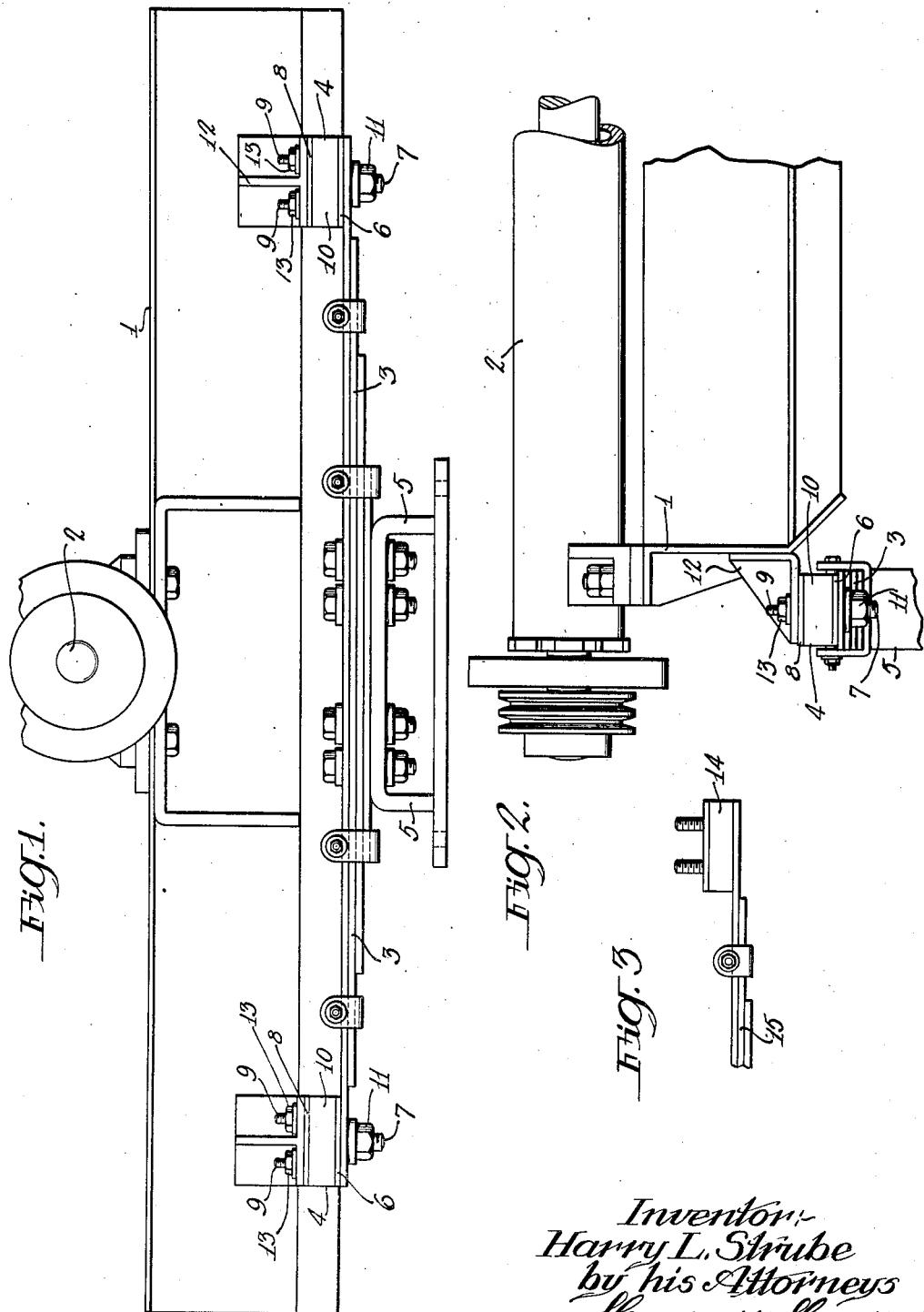
Inventor:-
Harry L. Strube
by his Attorneys
Howson & Howson Patented May 30, 1944

2,350,201

UNITED STATES PATENT OFFICE 2,350,201

RESILIENT SUSPENSION FOR VIBRATING SCREENS AND THE LIKE

Harry L. Strube, Philadelphia, Pa., assignor to Link-Belt Company, Chicago, Ill., a corporation of Illinois Application January 7, 1942, Serial No. 425,928

6 Claims. (Cl. 209—326)

This invention relates to improvements in resilient suspensions for vibrating screens and the like.

In a copending application Serial Number 331,-245, I disclosed a suspension for vibrating screens which by combining resilient rubber with resilient metal in a particular manner utilized certain properties of those materials to afford a suspension whose improved characteristics are particularly well adapted for supporting and controlling the gyratory screen movements. In that instance, the rubber elements of the suspension were arranged to operate solely in shear both as to the vibratory movement and in supporting the dead load of the screen.

I have discovered that materially improved results are obtainable by arranging the metal and rubber elements of the suspension so that the latter elements act in compression in sustaining the dead weight of the screen frame and in shear in providing for one component only of the gyratory motion of the frame, the other essential component of said motion being provided for by the resilient displacement of the metal springs. The aforesaid improved results extend not only to the functional characteristics of the suspension and the improved vibratory screen action which it affords, but also to the physical characteristics of the suspension itself and its ability to give efficient service over relatively extended periods of time.

The invention has been found to afford particularly satisfactory results with vibrating screens of the so-called unbalanced pulley type.

In the attached drawing:

Figure 1 is a side elevational view of a vibratory screen unit of the unbalanced pulley type having a suspension made in accordance with the invention;

Fig. 2 is a fragmentary front elevational view of the assembly shown in Fig. 1, and Fig. 3 is a fragmentary side elevational view illustrating a modification within the scope of the invention.

With reference to the drawing, I is a screen frame upon which is journaled, in conventional manner, an unbalanced pulley actuator 2, the said actuator being supported entirely on the frame. 3 is a metallic leaf spring, and in the present instance one such spring is provided at each longitudinal side of the screen frame. At each end of each of the springs is a rubber unit 4, and through these units the springs are connected to the said frame. The arrangement is such that the screen frame I is supported upon the springs 3 solely through the medium of the rubber units 4. This assembly constitutes a screen unit which may be mounted upon any suitable base (not shown). It will be noted that in the present instance a bracket 5 is provided for each of the springs 3 through which the assembly may be secured to the base structure.

In the embodiment shown in Figs. 1 and 2, the rubber unit 4 consists of a lower plate 6, having a depending stud bolt 7. This unit further comprises an upper plate 8 having extending upwardly therefrom two relatively small stud bolts 9, 9. Intermediate the plates 6 and 8 and attached thereto, preferably by vulcanization, is a block 10 of resilient rubber. In the particular embodiment shown in Figs. 1 and 2, the stud 7 extends downwardly through an aperture in the free end of the upper leaf of the spring 3, and receives a nut 11 by means of which the unit 4 is rigidly secured to the spring. The two stud bolts 9 extend upwardly through apertures in a bracket 12 which is secured to the side of the screen frame 1, said bolts being secured in the bracket by means of nuts 13. As illustrated, the bracket seats upon the plate 8, and through this bracket, the weight of the screen frame 1 is imposed upon the rubber block 10, the rubber acting in compression to sustain this load.

In Fig. 3, I have illustrated an embodiment wherein the resilient rubber block 14 is secured, preferably by vulcanization, directly to the end of the upper leaf of the spring 15, thereby eliminating the plate 6 of the previously described embodiment and the necessity for perforating the leaf spring for reception of a securing bolt.

The unbalanced pulley type of operation is well adapted to produce vibratory movements of high efficiency, particularly of the smaller amplitudes. By reason of the fact that the actuator is mounted directly on the vibratory screen member or frame, however, the character of the vibratory movement is dependent largely upon the character of the resilient suspension which constitutes the restraining and regulating factor. The aforedescribed suspension is particularly well adapted for this function. It affords a gyratory vibratory motion, for example, of exceptional smoothness and uniformity. This is due in part to the fact that the dead load of the screen body and of the material under treatment is taken by the rubber in compression, a state in which the rubber is well adapted to assume this load. Except for the cushioning action of the compressed rubber, the components of the gyratory movements at right angles to the plane of the screen surface are provided for by the resilient displacements of the metal springs which are best suited to sustain the heavy mass of the loaded screen in these movements. The components of the gyratory movements which are parallel to the plane of the screen surface are provided for by the resilient displacements in shear of the rubber elements which take place in a plane at right angles to the direction in which the displacement of the metal springs occurs. As a result, the screen exhibits an exceptionally high efficiency and durability.

Screen units of the character illustrated in the drawing are generally mounted in position inclined to the horizontal, and with the arrangement shown, the rubber elements would not then act solely in compression in sustaining the dead load of the frame. This could be corrected, if desired, by an obvious relative rearrangement of the parts of the resilient suspension, or by a relative rearrangement of the frame and the suspension as a whole. All such arrangements and rearrangements are within the scope of the invention as defined by the appended claims. It is to be noted also that while the invention is of particular importance in conjunction with screens of the unbalanced pulley type, it has utility also in screens employing other types of actuation. Furthermore, in its broader aspects, the invention may find application in principle to vibratory apparatus other than screens wherein vibratory motion in given planes is imposed by suitable mechanism upon a vibratory body or member for the performance of useful work, as, for example, in certain types of conveyer.

I claim:

1. In a vibrating screen comprising a screen frame and means associated with the frame for imposing thereon gyratory vibrations in substantially vertical planes, a resilient support for the frame consisting of metal springs resiliently displaceable in a direction generally parallel to said planes of vibration, and elements of resilient rubber interposed between the springs and the frame so as to sustain the dead weight of the latter primarily in compression, said elements being free for resilient displacement in shear in a direction also generally parallel to said planes of vibration but substantially at right angles to the said direction of displacement of the springs.

2. In a vibrating screen comprising a screen frame and means associated with the frame for imposing thereon gyratory vibrations in vertical planes, a resilient support for the frame consisting of a metal leaf spring resiliently displaceable in a direction generally parallel to said planes of vibration so as to provide for one component of said gyratory motion, and elements of resilient rubber interposed between the springs and the frame and free for resilient displacement in shear in planes angularly intersecting the said vertical planes of vibration and the direction of spring displacement and providing for another component of said gyratory motion.

3. In a vibrating screen comprising a screen frame and means associated with the frame for imposing thereon gyratory vibrations in vertical planes, a resilient support for the frame consisting of a metal leaf spring at each side of and jointly supporting the frame and arranged for flexure in substantially vertical planes so as to provide for one component of said gyratory motion, and elements of resilient rubber interposed between the springs and the frame and being free for resilient displacement in shear in planes substantially at right angles to the planes of spring flexure, the direction of said shear displacement being substantially at right angles to the direction of said component so as to provide for the other component of said gyratory movement.

4. In a vibrating screen comprising a screen frame and means associated with the frame for imposing thereon gyratory vibrations in predetermined planes, a resilient support for the frame consisting of metal leaf springs supporting the frame and arranged for resilient displacement in directions substantially paralleling the said planes of vibration, and elements of resilient rubber interposed between the springs and the frame and being free for resilient displacement in shear in planes substantially at right angles to the said planes of vibration and in a direction substantially parallel to said planes and at right angles to the said direction of spring displacement, the said spring and rubber displacements thereby providing respectively for the two major components of said gyratory movement.

5. In a vibrating screen comprising a screen frame and unbalanced rotary means supported by said frame for imposing on the latter gyratory vibrations in planes substantially at right angles to the axis of said rotary means, a resilient support for the frame consisting of metal springs resiliently displaceable in direction substantially parallel to the said planes of vibration, and elements of resilient rubber interposed between the frame and the springs so as to sustain the dead weight of the frame primarily in compression, said rubber elements being free for displacement in shear in planes substantially at right angles to the said planes of vibration and in a direction substantially paralleling said planes at right angles to the said direction of spring displacement.

6. In vibrating apparatus comprising a vibratory body and means for imposing on said body vibratory motion in specified planes, a resilient support for said body consisting of a metal spring affording said body a substantially unidirectional movement in substantial parallelinity with said planes, and elements of resilient rubber interposed and forming the sole connection between said spring and body, said elements being normally held under compression by the dead weight of the body and being free for flexure in shear in planes intersecting the lines of said unidirectional movement and also in a direction substantially parallel to said specified planes of vibration.

HARRY L. STRUBE.